US005139595A

United States Patent [19]

Taylor

[11] Patent Number: 5,139,595

[45] Date of Patent: Aug. 18, 1992

[54] GAS FILLING SYSTEM FOR GLAZING PANELS

[76] Inventor: Donald M. Taylor, R.R. #1, Orangeville, Ontario, L9W 2Y8, Canada

[21] Appl. No.: 552,713

[22] Filed: Jul. 16, 1990

[51] Int. Cl.[5] ........................ B32B 31/16; C03C 27/12

[52] U.S. Cl. .................................... 156/104; 156/109; 52/304; 52/788

[58] Field of Search ............... 156/104, 105, 109, 382; 52/304, 307, 308, 788; 141/4

[56] References Cited

U.S. PATENT DOCUMENTS

| | | | |
|---|---|---|---|
| 2,213,395 | 9/1940 | Hopfield | 156/109 |
| 2,756,467 | 7/1956 | Etling | 52/304 |
| 3,683,974 | 8/1972 | Stewart et al. | 141/4 |
| 4,369,084 | 1/1983 | Lisec | 156/382 |
| 4,780,164 | 10/1988 | Rueckheim et al. | 156/382 |
| 4,886,095 | 12/1989 | Lisec | 141/4 |
| 5,017,252 | 5/1991 | Aldrich et al. | 156/104 |
| 5,080,146 | 1/1992 | Arastel | 156/382 |

*Primary Examiner*—Michael W. Ball

*Assistant Examiner*—Francis J. Lorin

[57] ABSTRACT

A system for providing multi-paned glazing lights, primarily for use as insulated glazing units in door and windows, employs noble gases for filling the insulative spaced enclosed between the glazing panes. The system uses the glazing light or lights as a gas flow manifold, mounted within a sealed vacuum chamber, for evacuating the chamber and the one or more glazing lights located therein. The glazing light, or lights, then also serve as the gas flow manifold for filling the lights and the surrounding exhausted chamber with the required noble gas. The system operates at room temperature, and enables selection of the internal pressure of the noble gas within the glazing units, in accordance with predetermined factors such as the altitude of the ultimate site where the lights are destined to be used. The lights are sealed off within the vacuum chamber, prior to removal therefrom, while in a controlled environment. The system enables consistent, extremely high gas fillings such as 97% noble gas, in a relatively rapid, economic and ecologically conservative manner.

4 Claims, 1 Drawing Sheet

FIG.1.
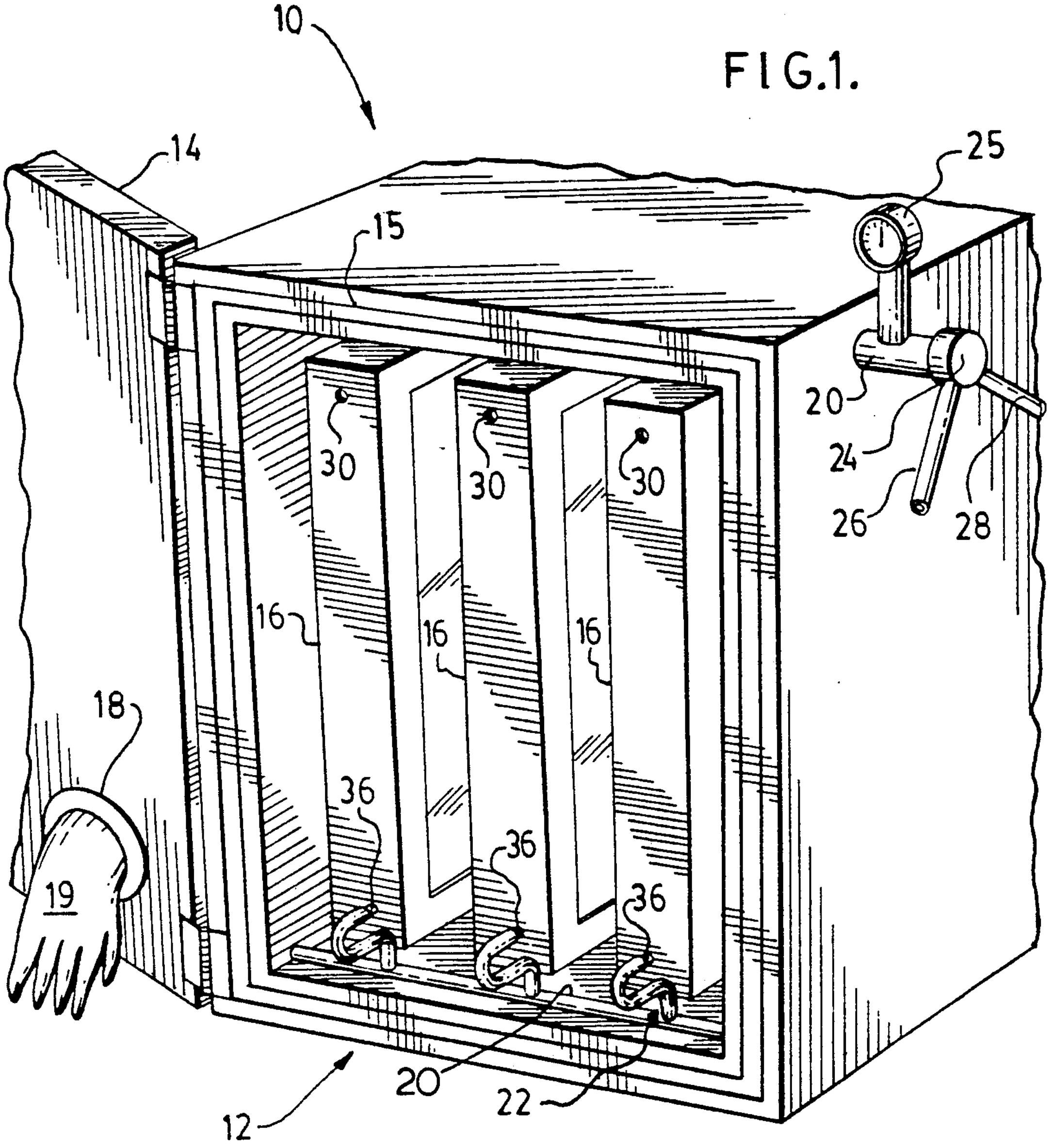
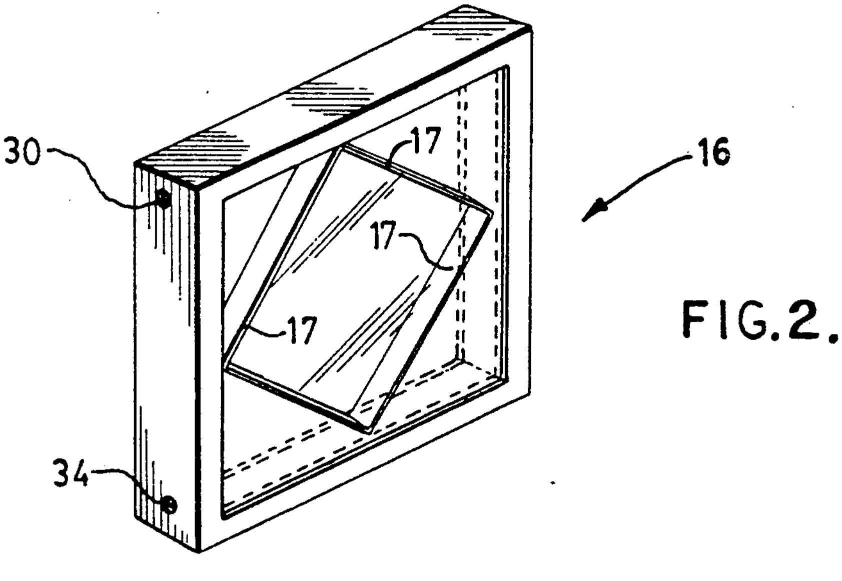
FIG.2.

GAS FILLING SYSTEM FOR GLAZING PANELS

TECHNICAL FIELD

This invention is directed to a system for manufacturing sealed glazing light units, as used in doors and windows, and in particular, to filling the sealed lights with a selected gas content to a high degree of purity.

BACKGROUND ART

Efforts to improve the effectiveness of multi-paned glazing lights, and to enhance their longevity have been directed to the provision of improved peripheral seals, to the use of humidity controlling, hygroscopic agents within the lights, and the introduction of selected, controlled atmospheres within the lights. A filling of pure noble gas such as argon, krypton or the like can improve the insulative value of the glazing unit by as much as 10%.

The virtual exclusion of oxygen by providing a 95% to 97% concentration or better, gas filling, to minimize the presence of atmospheric oxygen, substantially extends the effective life span of the glazing unit, by delaying the onset of degradation due to oxidation.

In U.S. Pat. No. 2,213,395 September 1940, Hopfield, the use is taught of a vacuum chamber for evacuating window lights, and the introduction therein of heated dried air, for purposes of minimizing the level of humidity within the light. This prior method suffers from the disadvantages that in order to achieve a high degree of control of the ultimate air filling, an unduly high level of vacuum is required, while the use of heated, dried air as the filling agent leads to a glazing light, in the cooled working condition, wherein internal pressure has not been accurately set in relation to atmospheric pressure.

Use of this prior system for purposes of filling lights with noble gases suffers from the drawbacks of:

1) requirement to pump down to an unduly high level of vacuum;
2) inability to consistently fill to a high percentage purity of noble gas;
3) undue amount of time to achieve unit filling;
4) absence of provision to seal window lights within the protective environment of the vacuum chamber;
5) somewhat large losses of noble gas to the outside environment.

A gas filling system, relying solely upon gradual displacement of air within a glazing unit, due to the greater density of the displacing gas, has been used and is unduly slow, and is further limited by the shape of the glazing light. (U.S. Pat. No. 4,369,084, January 1983 Lisec)

Thus, lights of an irregular shape may be totally unsuited to utilizing this method.

Another system, is shown in U.S. Pat. No. 3,683,974 August 1972, Stewart et al. involving the introduction of the noble or other gas as the purging and air displacement medium within a window light. This system is not consistent in the degree of purity of fill gas achieved, while requiring unduly large amounts of the fill gas, as the purging medium, being discharged to atmosphere. The defects of the system are more apparent in the case of window lights incorporating internal pane dividers or other obstructions, which act as impedances to effective purging flow. Precise control of ultimate fill pressure is difficult to achieve.

DISCLOSURE OF INVENTION

In accordance with the present invention for providing multi-paned glazing light units having a predetermined internal atmosphere, using a sealed vacuum chamber to receive at least one such light in inserted relation therein, the glazing light is connected in interposed selective gas flow relation between the interior of the chamber and a vacuum source or a gas fill source, such that evacuation of air from the chamber takes place through the glazing unit, serving as a gas vacuum manifold, and the admission of a gas, or mixture thereof, to constitute the predetermined atmosphere, also takes place through the glazing unit, serving as a gas fill manifold, whereby a high degree of gas fill of the units is achieved.

It has been found that, in contrast to prior art system requiring a high level of evacuation, the present invention, utilizing evacuation of the vacuum chamber to a moderate extent such as 10 inches of mercury (below atmospheric pressure), can consistently and rapidly achieve subsequent gas filling concentration of krypton or argon to about 97% purity and sometimes even higher.

The gas purity of the sealed unit may be tested and retested, using an inserted sampling needle, akin to a hypodermic needle, inserted through the protective peripheral seal of the gas filled glazing unit, to withdraw a small quantity of the gas content for sampling.

The gas purity is determined in accordance with the oxygen percentage content of the fill gas, as sampled.

Reliable testing accuracy is dependent upon testing the filled unit some two to three days after the completion of filling, so as to permit the complete diffusion of air trapped within the glazing unit at the time of filling. In the case of complex glazing units containing internal frame or shade components and the like within the sealed glazing space, which constitute an internal flow indepedance, the increased tendency for air entrapment makes more imperative the provision of a sufficient delay period before attempting to verify the final degree of purity of fill gas achieved.

In a preferred embodiment of the invention, wherein the fill gas in use has a specific gravity greater than air the manifold connections to the glazing unit comprise a vacuum/gas fill port attachment low down on the glazing unit and a manifold inlet/outlet connecting with the vacuum chamber, preferably located high up on the glazing unit.

A particular beneficial characteristic of the present system is the usefulness thereof with non-metallic deformable glazing seals such as those set forth in my co-pending application Ser. No. 07/366,069, filed June 14, 1989 abandoned. The effective use of a glazing unit as the vacuum manifold, while located within a sealed vacuum chamber, permits the application of a significant degree of vacuum to the interior of the glazing unit, while substantially avoiding the application of corresponding compressive mechanical forces thereagainst, due to atmospheric air pressure. The differential pressure drop existing between the interior of the glazing unit or units and the interior of the vacuum housing in which they are situated is primarily the pressure drop arising across the passage of communication between the two spaces, i.e. the glazing unit interior and the vacuum chamber interior, due to the rate of flow of air or other gas therethrough. Local interior pressure drops within the glazing unit may also occur as a consequence of interior flow impedance, due to the presence of internal hardware such as muntins, dividers and other internal fittings.

Thus, the differential pressure acting upon the faces of the glazing units may be very slight, and may be moderated by the rate of flow applied to the system and the size of the intervening passage or passages interconnecting the two spaces or chambers.

The present invention further provides a vacuum chamber, in use to receive at least one hollow glazing unit therein; vacuum pump means connected with the chamber, including conduit means within the chamber, in use to connect the vacuum pump means in pressure sealed relation with the interior space of the hollow glazing unit.

In a preferred embodiment, a single flow control valve is provided, to control connection of the vacuum pump means to the conduit means, to evacuate the interior of the vacuum chamber to a predetermined pressure level, by way of the hollow glazing unit or units acting as the flow manifold to the chamber; to terminate connection of the glazing unit to the vacuum pump means; and to connect the conduit means to a gas supply source, for the passage therethrough of gas from the source into the chamber by way of the interior of the glazing unit, again acting as the flow manifold to the chamber.

In use it has been found that achievement of a −10″ Hg vacuum level in the chamber (i.e. ten inches of mercury below atmospheric pressure) can lead to a 95% gas fill content, upon subsequent admission of gas through the unit to the chamber. By increasing the extent of vacuum up to 27″ Hg, filling to 99% purity can be achieved.

The chamber further includes at least one glove box, giving sealed manipulation access from outside to the interior of the chamber. This permits manual connection and disconnection of the glazing units in relation to the vacuum and gas fill conduit, and the hermetic sealing of the two glazing unit gas connection inlet/outlets ports.

The present invention further provides a hollow glazing unit having at least two glazing panes in facing, substantially parallel edge sealed relation, and a predetermined interior gas content other than air of at least 95% purity, at a predetermined internal pressure.

The present invention makes possible the precise control of gas pressure within the glazing units. This is of particular importance for glazing units that are sealed at sub-atmospheric pressure, for installation at higher altitude locations.

The invention further provides a hollow, substantially sealed glazing unit in combination with a sealed vacuum chamber having at least one connection for the application of vacuum suction to the chamber and the supply of filling gas thereto, wherein the glazing unit is located within the chamber, having the interior of the glazing unit connected at a first peripheral location with the at least one connection, and communicating with the interior of the chamber at a second peripheral location spaced from the first peripheral location, whereby the glazing unit serves as an interior gas flow manifold to the vacuum chamber and is effectively emptied of air upon the application of vacuum to the connection; and is effectively filled with gas upon filling with gas of the vacuum chamber through the glazing unit.

The glazing unit used in combination with the vacuum chamber may incorporate deformable, non-metallic peripheral glazing seals substantially incapable of resisting significant mechanical forces arising from gas pressure imbalance from the interior and the exterior of the glazing unit.

BRIEF DESCRIPTION OF DRAWINGS

Certain embodiment of the invention are described by way of illustration, without limitation of the invention thereto, reference being made to the accompanying drawings, wherein;

FIG. 1 is a general view and partial schematic of a vacuum chamber system for carrying out the present invention, including a glove box provision; and FIG. 2 is a general view of a typical glazing unit, showing the location of gas flow connections thereto.

BEST MODE OF CARRYING OUT THE INVENTION

Referring to FIG. 1, the system 10 comprises a strongly structured vacuum chamber 12 having an openable access door 14 equipped with latches (not shown), having a peripheral seal 15, through which door the assembled glazing lights 16 may be inserted and removed.

A number of glove boxes 18 with gloves 19 are provided, only one of which is shown, to give manual access to the glazing lights 16 when the chamber is closed and sealed.

A manifold pipe 20 having flexible connectors 22 for connection to the lights 16 connects to an exteriorly located manifold valve 24. A pressure gauge 25 extending from manifold pipe 20 gives accurate indication of pressure effective in the glazing lights 16.

Connection 26 connects the valve 24 to a vacuum system (not shown) having a vacuum pump, and preferably a vacuum bottle to serve as an accumulator.

Connection 28 connects the valve 24 to a gas supply (not shown) generally comprising a gas cylinder containing a gas such as krypton or argon.

Gas flow connection to the interior-of chamber 12 is provided by ports 30, illustrated as being located at the front edge of the glazing light units 16. The glazing light units 16 thus serve both as internal vacuum and as gas supply manifolds to the chamber 12, when the chamber is sealed closed.

The manifold valve 24 has three positions, namely, a fully closed position in which the gas manifold 20 is sealed; a second, vacuum position, in which the manifold 20 is connected by way of connection 26 to the vacuum pump system; and a third, gas fill position in which the manifold 20 is connected by way of connection 28 to the gas supply.

Referring to FIG. 2, the glazing lights 16′ are illustrated as having a pair of access ports 30, 34. The lower port 34 can receive an insert nipple 36 connecting by way of connector 22 to the manifold 20.

The upper port 30 constitutes the vacuum/gas manifold connection to the interior of the chamber 12.

The glazing unit 16 is illustrated as containing a decorative set of partitions 17 which serve as internal gas flow impedance to the function of glazing unit 16 as an internal manifold for the vacuum chamber 12.

In operation, with one or more glazing units 16 connected in situ the door 14 is closed and sealed, the gloves 19 being generally tied off, to preclude undue stressing thereof by the atmosphere when vacuum is applied to the system.

Actuation of valve 24 commences pull down of the system, and air within the chamber 12 and its contents is evacuated through manifold pipe 20 and its connections. It will be evident that air within the chamber 12 exits by way of the top port 30, through the glazing units 16 to bottom port 34, and then to the vacuum connection 26.

During evacuation, there are generally extremely small local difference in pressure within chamber 12, due to the rate of evacuation adopted.

When gauge 25 indicates that the desired degree of vacuum has been achieved, the valve 24 is actuated, closing off vacuum connection 26, and connecting the system to gas connection 28.

The rate of gas in-flow is generally controlled by operation of a pressure reduction regulator forming a part of the gas supply, (not shown) as is well known in the art. The valve 24 is not normally used in a pressure regulating sense.

A controlled rate of gas flow limits the pressure drop of gas leaving the top access port 30 to fill the chamber 12, thereby controlling and limiting the positive pressure acting within the glazing units 16.

The gauge 25 indicates when a desired internal gas pressure within manifold 20 and glazing units 16 has been achieved, being close to atmospheric.

The deviation of internal gas pressure within the filled glazing units from local atmospheric pressure generally will be determined by the ultimate geographic destination of the glazing units 16.

Glazing units manufactured in Toronto, Ontario, Canada, for use in Calgary or Edmonton, Alberta, Canada may be under-pressurized to a desired extent to accommodate to about 4000 feet difference in altitude between the location of manufacture and the location of use. Allowance also may be made for immediate barometric condition, at the time of manufacture.

Using the glove boxes 18, with the internal gas pressure sensibly atmospheric, the gloves may be deployed, and with the system still sealed tight, the connecting nipples 36 may be removed and plugs and sealing compound, previously located within the chamber 12, may be applied, to seal off the top and bottom apertures 30, 34.

This being accomplished, the pressure within the chamber 16 may be balanced to atmosphere, and the chamber suitably ventilated, in order to limit the emission of the excess argon or krypton therefrom into the work place.

The door 14 may then be opened and the completed glazing units 16 removed for further processing and packaging.

Subsequent unit testing for gas content purity and pressure verification testing, by way of inserting hypodermic needles into the gas space, preferably some days after the gas filling procedure, gives an accurate count of the percentage oxygen content of the unit gas fill, using commercially well known oxygen detectors, from which the unit percentage content and pressure of fill gas may then be determined.

Gas content in the range 95 to 97 percent may be readily and consistently achieved, using relatively moderate values of vacuum. High vacuum can lead consistently to gas concentration as high as 99%.

INDUSTRIAL APPLICABILITY

This invention has wide application in the manufacture of high quality insulating glazing lights.

I claim:

1. A method for providing multi-paned glazing lights having an internal atmosphere of high purity, using a sealed vacuum chamber with sealed manipulation access means, comprising the steps of; installing at least one said light within said chamber; connecting a predetermined first filling port of said light to a manifold valve to switch selectively to a first, vacuum source and to a second, gas filling source; communicating a second filling port of said light to the interior of said vacuum chamber; whereby said light serves as an internal evacuation manifold and as a filling manifold for said vacuum chamber; selecting said first, vacuum source, thereby reducing the pressure within said light and said chamber to a predetermined pressure, by way of said light manifold, then selecting said second, gas filling source, and filling said light and said vacuum chamber to a predetermined pressure with said gas; and sealing said filling ports of said light with said sealed manipulation access means while said light is in said chamber and maintaining said chamber in a sealed condition, whereby a consistently high purity value of gas filling of the interior of said light is achieved.

2. The system as set forth in claim 1, wherein said gas is a noble gas compatible with the long term life of said light, said consistently high purity value being at least 95%.

3. The system as set forth in claim 2, said vacuum chamber wherein the sealed manipulation access means comprises glove means on said vacuum chamber to provide access to said light when installed within the chamber.

4. The system as set forth in claim 2, including using control valve means connected with said vacuum source and said gas filling source, to permit achievement of desired levels of vacuum and of final gas pressure within said chamber and said units.

* * * * *